2,941,967

PRODUCTION OF POLYURETHANE FOAM USING CATALYSTS CONTAINING ALIPHATICALLY BOUND ETHER OXYGEN ATOM AND A TERTIARY AMINO GROUP

Friedrich Möller and Erwin Muller, Leverkusen, Peter Hoppe, Troisdorf, and Gunther Braun, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware No Drawing. Filed July 18, 1957, Ser. No. 672,559

Claims priority, application Germany July 21, 1956

6 Claims. (Cl. 260—2.5)

This invention relates to a process for producing polyurethane foam. More particularly, the invention is concerned with a process for producing polyurethane foam which involves the use of specific catalysts.

It is well known to produce polyurethane foam by reacting a high molecular weight polyhydroxy compound, such as an hydroxyl polyester or a polyalkylene ether glycol, with a polyisocyanate and water in the presence of accelerators and emulsifiers. As accelerators, there are commonly used tertiary amines. It is also known that the selection of the proper accelerator is of great importance in the production of polyurethane foam because of the fact that the formation of polyurethane foam is due to at least three chemical reactions, i.e., a polyaddition reaction between the high molecular weight polyhydroxy compound and the polyisocyanate, a cross-linking reaction with water serving as the cross-linking agent, and the evolution of carbon dioxide by a reaction of water with free isocyanato groups. Consequently, only those compounds will be suitable as catalysts in the production of polyurethane foam which not only accelerate the total reaction but also synchronize the individual reaction steps or, more precisely, cause the individual reaction steps to proceed in the proper time relation to one another. Only if these conditions are met, an end product of uniform structure and of the desired low density is obtained.

However, it has been found extremely difficult to make polyurethane foam of an entirely regular cell structure. Furthermore, it has been a constant problem to avoid shrinkage in the production of polyurethane foam. This problem is particularly undesirable when making rigid polyurethane foam serving as heat insulation material or a supporting material in sandwich constructions since in these applications shrinkage must be absolutely avoided.

It is a primary object of the present invention to provide a process for the production of polyurethane foam having improved mechanical properties. Another object of the present invention is to provide a process for the production of polyurethane foam having uniform cell structure. A further object is to provide a process for the production of polyurethane foam which does not shrink after its formation. Still further objects will appear hereinafter.

In accordance with this invention, generally speaking, the foregoing objects and others are accomplished by providing a process for the production of polyurethane foam which comprises reacting a high molecular weight polyhydroxy compound with a polyisocyanate and water in the presence of an organic compound containing at least one aliphatically bound ether oxygen atom and at least one tertiary amino group. The process of the invention is based on the discovery that organic compounds containing at least one aliphatically bound ether oxygen atom and at least one tertiary amino group are particularly advantageous catalysts in the production of polyurethane foam because they bring about an almost ideal timing of the individual reactions leading to the formation of polyurethane foam and also act beneficially on the properties of the polyurethane foam produced.

Among the organic compounds containing at least one aliphatically bound ether oxygen atom and at least one tertiary nitrogen atom which are used as catalysts in accordance with the present invention, there are compounds represented by the following general formulae:

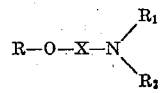

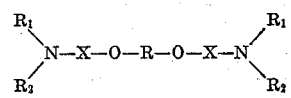

and

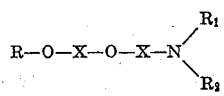

in which R stands for an aliphatic, cycloaliphatic or aromatic radical, X is an alkylene group with 2 to 6 carbon atoms, and $R_1$ and $R_2$ are alkyl or aralkyl radicals. $R_1$ and $R_2$ may be the same or different; they may also form a ring which, if desired, may include hetero atoms.

Representative examples of compounds containing at least one aliphatically bound ether oxygen atom and one tertiary amino group which can be used in the process of the invention include:

Dimethyl-(2-methoxy-ethyl)-amine
Diethyl-(2-methoxy-ethyl)-amine
N-(2-methoxy-ethyl)-piperidine
Dimethyl-(3-methoxy-propyl)-amine
Dimethyl-(3-ethoxy-propyl)-amine
Cyclohexyl-(3-dimethylamino-propyl)-ether
Diethyl-(3-methoxy-propyl)-amine
Dimethyl-(methoxy-ethoxy-propyl)-amine
Dimethyl-(ethoxy-ethoxy-propyl)-amine
Dimethyl-(butoxy-ethoxy-propyl)-amine
Diethyl-(ethoxy-ethoxy-propyl)-amine
Diethyl-(methoxy-ethoxy-ethoxy-propyl)-amine
Bis-(2-diethylamino-ethyl)-ether
(2-diethylamino-ethyl)-(3'-dimethylamino-propyl)-ether
Bis-(3-dimethylamino-propyl)-ether
1,4-bis-(3'-dimethylamino-propoxy)-butane
1,3-dimethyl-4,6-bis-(2'-diethylamino - ethoxy - methyl)-benzene
Bis-[2-(3'-dimethylamino-propoxy)-ethyl]-ether
1,2,3-tris-(3'-dimethylamino-propoxy)-propane
1,2,4-tris-(3'-dimethylamino-propoxy)-butane
p-Bis-[N-diethylamino-ethyl]-phenylene-ether
m-Bis-[N-diethylamino-ethyl]-phenylene-ether
2-(diethylamino-ethyl)-phenyl-ether
2-(diethylamino-ethyl)-dimethyl-phenyl-ether These and other compounds containing at least one aliphatically bound ether oxygen atom and at least one tertiary amino group can be prepared by various processes which are known per se.

The process of the invention is applicable to the production of elastic, semi-rigid and rigid polyurethane foam.

In carrying out the process of the invention, the components, i.e., high molecular weight polyhydroxy compound, polyisocyanate, water and catalyst, are mixed. In order to facilitate mixing, it is possible to utilize a small amount of an emulsifier as it is customary in the production of polyurethane foam. The components may be introduced separately into the mixing zone or two or more components may be premixed and the remaining components subsequently added to the mixture. Thus, it is possible to mix the catalyst and/or emulsifier with the high molecular weight polyhydroxy compound and to thereafter mix the other components with the mixture. It is also possible to prepare a so-called prepolymer by at first reacting the high molecular weight polyhydroxy compound with the polyisocyanate and to subsequently bring about foaming by reacting the prepolymer with water in the present of a catalyst of the type hereinabove defined, if desired, with the concurrent use of an emulsifier. Finally, it is possible to mix the catalyst with an emulsifier and water in the required ratio and to use this mixture by either mixing it with the highly molecular weight polyhydroxy compound and the polyisocyanate or with a prepolymer obtained from these two reactants. In this embodiment of the process of the invention, it is of advantage that mixtures of the new catalysts with water and an emulsifier can be stored over long periods without any changes in their composition due to chemical reactions.

The new accelerators are generally used in quantities of 0.5 to 5% by weight, based on the weight of the high molecular polyhydroxy compound, although smaller or larger quantities of the catalysts may also be used, if desired.

Any suitable polyhydroxy compound having a molecular weight ranging from about 500 to about 10,000 may be used in the process of the invention. Representative examples include hydroxyl polyesters of the alkyd type, polyalkylene ether glycols, hydroxyl polythioethers, hydrogenation products of carbon monoxide-olefine copolymers and the like. While hydroxyl polyesters of the alkyd type are usually prepared by thermal esterification of a dicarboxylic acid, such as succinic acid, adipic acid, suberic acid and phthalic acid, with polyhydric alcohols, such as ethylene glycol, diethylene glycol, the butylene glycols, glycerol and trimethylol propane, polyalkylene ether glycols may be obtained by polymerization of alkylene oxides, such as tetrahydrofuran, or by alkoxylation of polyhydric alcohols. Suitable hydroxyl polythioethers may be prepared by etherification of thioether glycols with polyhydric alcohols or by the action of alkylene oxides on thioether glycols or by reaction of hydrogen sulfide with alkylene oxides.

Any suitable polyisocyanate may be utilized in the process of the invention. Examples of the commonly employed polyisocyanates include tetramethylene diisocyanate, hexamethylene diisocyanate, the phenylene diisocyanates, the toluylene diisocyanates, 1,5-naphthylene diisocyanate, p,p'-isocyanato diphenylmethane, p,p'-diisocyanato diphenyl dimethylmethane and 1,4-diisocyanato cyclohexane.

Among the emulsifiers which are commonly employed in the production of polyurethane foam and suitable for use in the process of the instant invention, there may be mentioned ordinary soaps, high molecular weight alkyl sulfonates, high molecular weight alkyl sulfates, high molecular weight aryl sulfonates and ammonium as well as amine salts of high molecular weight fatty acids.

Although the ratio of the components may be varied over a wide range, it is customary to employ the polyisocyanate component in an amount in excess over that required to react with the hydroxyl groups contained in the high molecular weight polyhydroxy compound. Thus, if the hydroxyl compound is an hydroxyl polyester of the alkyd type having an average molecular weight of 2,000 and if the polyisocyanate component is a technical mixture of 1,2,4- and 1,2,6-toluylene diisocyanate, 20 to 500 parts by weight of the latter may be used per 100 parts by weight of polyester. The amounts of water and emulsifier used in the process of the invention generally range from about 0.5 to 10% and 0.1 to 10% by weight, respectively, based on the weight of the polyhydroxy compound.

Details as to the starting materials and reaction conditions which may be used in the production of polyurethane foam in general and in the process of the invention in particular are described in the literature, such as in "German Plastics Practice" by DeBell et al. (1946), pages 316 and 463 to 465, "Angew. Chemie." A 59, 257 (1947), "Modern Plastics" 24, 149 (1947), U.S. Patents 2,620,516; 2,621,166; 2,729,618; 2,778,810; and 2,764,-565 and German Patent 929,507, the disclosure of which is hereby incorporated herein by reference.

Polyurethane foam produced with the catalysts of the instant invention does not show any sign of primary shrinkage (shrinkage by cooling immediately after the foaming process) or of a secondary shrinkage (shrinkage in the tropical test). Moreover, the otherwise frequently observed loss of carbon dioxide during the blowing operation is greatly reduced, so that the quantity of carbon dioxide produced can be completely utilized for the blowing process. Elastic foam materials produced with these accelerators have a very uniform pore structure and are very soft. Moreover, when the accelerators according to the invention are used, the resistance to aging of the foam materials is substantially improved. As compared with a drop in the physical values by 50% with the foam materials manufactured with the hitherto usual activators, the drop when using ether amines is only 10%.

The invention is further illustrated by the following examples without being restricted thereto.

EXAMPLE 1

Production of a hard foam material with a bulk density of 25–30 kg./cc. A mixture of 80 parts of a polyester prepared from 146 g. of adipic acid, 29.6 g. of phthalic anhydride, 228 g. of trimethylol propane and 15 g. of triethanolamine and having an hydroxyl number of 350 is fed, together with 20 g. of a polyethylene oxide wax, 2 parts by weight of siliceous chalk and 2 parts by weight of silica aerogel, at a temperature of 50° C. to the premixing chamber of a mechanical mixing device (see U.S. Patent application Serial No. 596,117, filed July 5, 1956), into which there is also introduced 7 parts by weight of a mixture of 3 parts by weight of 2-(diethylamino-ethyl)-phenyl ether and 4 parts by weight of sulfonated castor oil to be homogenized with the polyester. In the injection chamber following the premixing chamber, for example, a hand nozzle, 85 parts by weight of toluylene diisocyanate are added to the polyester-accelerator combination by injection mixing. The foaming of the reaction mixture stops after about 60 seconds.

The mixture leaving the mixing apparatus can, for example also be introduced into cavities and can be compressed by suitable means to a higher bulk density of, for example, 100 kg./cu.m. The heat resistance of the foamed material obtained is 120° C.

EXAMPLE 2

100 parts by weight of a polyester prepared from 292 parts by weight of adipic acid, 148 parts by weight of phthalic anhydride, 770 parts by weight of trimethylol propane and 282 parts by weight of oleic acid and having an hydroxyl number of 350, the said polyester containing 2 parts by weight of silica aerogel, are initially homogenized in the premixing chamber of a mixing device with 7.5 parts by weight of an activator mixture consisting of 3 parts by weight of 2-(diethyl-amino ethyl)-phenyl ether and 4 parts by weight of sulfonated castor oil. The temperature of the polyester should be about 60° C. 85 parts by weight of toluylene diisocyanate are injected into the mixture in an injection chamber connected to the premixing chamber. The foamed material obtained has a bulk density of 25 kg./cu.m. After an incubation period of about 4 seconds, the foaming process takes place very quickly and a very strong final expansion of the foamed material up to 95% is observed on conclusion of the reaction, this being due to the improved cell structure. This foamed material has a heat resistance of about 150° C. and a very low water absorption capacity.

EXAMPLE 3

100 grams of a polyester prepared from adipic acid, diethylene glycol and trimethylol propane are mixed with 2 g. of bis-(N-diethyl ethyl)-ether of resorcinol, 1 g. of diethyl ammonium oleate, 1.5 g. of castor oil sulfate (54% water content) and 1.5 g. of water. After adding 36 g. of toluylene diisocyanate, a foamed material is obtained which is characterized by a very uniform pore structure.

EXAMPLE 4

100 g. of a polyester prepared from adipic acid, diethylene glycol and trimethylol propane are mixed with 1 g. of dimethyl-(methoxy-ethoxy-propyl)-amine, 1 g. of diethyl ammonium oleate, 0.5 g. of castor oil sulfate (54% water content) and 3 g. of water and thereafter foamed with 43 g. of toluylene diisocyanate. When subjected to an aging test (at 70° C. 16 days and 95% humidity), the foamed material shows a decrease by 5% in the impact hardness test. With conventional foams, this decrease is about 10 times greater.

EXAMPLE 5

100 g. of the polyester referred to in Example 3 are mixed with 0.5 g. of dimethyl-(3-methoxy-propyl)-amine, 3 g. of an emulsifier (condensation and addition product obtained from hydroxy diphenyl, benzyl chloride and ethylene oxide in 50% aqueous solution), 1 g. of castor oil sulfate (54% water content), 1 g. of ricinoleic acid sulfate (54% water content) and 0.7 g. of water, and thereafter foamed with 41 g. of toluylene diisocyanate. When subjected to an aging test (see Example 4), the drop in the impact hardness was 3%.

EXAMPLE 6

100 g. of a branched polyester obtained from adipic acid, phthalic acid and hexanetriol are mixed with 0.5 g. of dimethyl-(3-methoxy-propyl)-amine and 5 g. of castor oil sulfate (54% water content) and foamed by addition of 75 g. of toluylene diisocyanate. A hard foamed material is obtained which has a low brittleness factor and a very low water absorption capacity (0.3% by volume).

EXAMPLE 7

100 g. of the polyester according to Example 3 are mixed with 1.5 g. of 1,3-dimethyl-4,6-bis-(2'-diethyl-aminoethoxy-methyl)-benzene, 1 g. of diethyl ammonium oleate, 1 g. of castor oil sulfate (54% water content) and 2.8 g. of water. By adding 43 g. of toluylene diisocyanate, the mixture is foamed to form a foamed material with a bulk density of 34 kg./cub.m. The impact hardness of this material decreases by 11% when artificially aged as described in Example 4.

EXAMPLE 8

Polyurethane foam produced with the catalysts of the instant invention has improved aging properties as compared with polyurethane foam prepared in the presence of a morpholine. The following table shows the decrease in tensile strength and resistance to compression of various samples subjected to artificial aging at 70° C. and at a humidity of 95% for 16 days.

| Foam sample prepared with— | Tensile strength (decrease in percent) | Resistance to compression (decrease in percent) |
| --- | --- | --- |
| N-ethyl morpholine | 15 | 25 |
| 2-(diethylamino-ethyl)-phenylether | 0 | 6 |
| N-methylmorpholine | 20 | 25 |
| Dimethyl-(3-ethoxypropyl)-amine | 0 | 5 |

EXAMPLE 9

100 parts by weight of a polypropylene glycol having a molecular weight of about 2000, 3 parts by weight of trimethylolpropane and 36 parts by weight of toluylene diisocyanate are heated together for 2 hours at 100° C. A prepolymer is thus obtained having a NCO content of 7.5%.

100 parts by weight of the prepolymer are mixed with 1.5 parts by weight of dimethyl-(3-methoxy-propyl)-amine, 1.5 parts of a sulfonated castor oil having a water content of 55%, and 1.5 parts of water. A soft foamed material is obtained having a bulk density of 42 kg./m³.

EXAMPLE 10

100 parts by weight of a polyacetal prepared from butane dioxethyl glycol, castor oil and formaldehyde and having an OH number of about 60 are mixed with 0.7 parts by weight of dimethyl-(3-methoxy-propyl)-amine, 1 part by weight of sulfonated castor oil having a water content of 55%, 1 part by weight of a sulfonated polyol as emulsifier and 2.0 parts by weight of water. By adding 30.2 parts by weight of toluylene diisocyanate the mixture is foamed to form a foamed material with a bulk density of 42 kg./m³.

EXAMPLE 11

100 parts by weight of a polythioether consisting of 100 parts by weight of thiodiglycol, 15 parts by weight of triethylene glycol, 9 parts by weight of castor oil and 2 parts by weight of maleic anhydride and having an OH number of about 58 are mixed with 0.5 parts by weight of dimethyl-(3-methoxypropyl)-amine, 2 parts by weight of an addition product of p-oxy diphenyl, benzyl chloride and ethylene oxide as emulsifier, 2.5 parts by weight of sulfonated castor oil having a water content of 55%, 1 part by weight of a sulfonated ricinoleic acid having a water content of 55%, 1 part by weight of water and 0.5 part by weight of paraffin oil. By adding 36.8 parts by weight of toluylene diisocyanate the mixture is foamed to form a foamed material with a bulk density of 31 kg./m³.

EXAMPLE 12

100 parts by weight of a branched polyester obtained from 1 mol adipic acid, 2 mols of phthalic acid anhydride, 1 mol of oleic acid and 5.3 mols of trimethylol propane and having an OH number of 350 are mixed with 0.5 part by weight of dimethyl-(3-methoxy-propyl)-amine and 4 parts by weight of castor oil sulfate (55% water content) and foamed by addition of 85 parts by weight of toluylene diisocyanate. A hard foamed material is obtained with a bulk density of 39 kg./m³.

Although certain representative embodiments and details have been shown for the purpose of illustrating this invention, it will be apparent to those skilled in the art that various changes and modifications may be made therein without departing from the spirit and scope of the invention except as set forth in the claims.

What is claimed is:

1. In a process which comprises reacting an organic polyisocyanate, water and a member selected from the group consisting of a polyester prepared by esterification of a polyhydric alcohol and a polycarboxylic acid, a polyalkylene ether glycol, a polythioether glycol, and a polyacetal, said group member having a molecular weight of at least about 500, to form a polyurethane foam, the improvement which comprises including in the reaction mixture a catalytic amount of a member selected from the group consisting of a compound having the formula

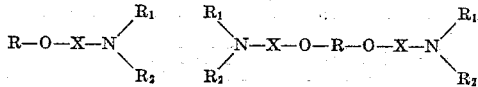

and

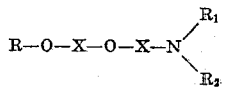

wherein R is a member selected from the group consisting of lower aliphatic, cycloaliphatic and phenyl radicals, X is an alkylene radical having from 2 to 6 carbon atoms and

is selected from the group consisting of

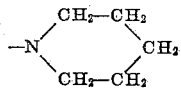

and

wherein Y is selected from the group consisting of $-CH_3$ and $C_2H_5$.

2. The process of claim 1 wherein the organic polyisocyanate and the member of the group reactable therewith are reacted to form a prepolymer and the prepolymer is reacted with water while mixed with the said catalyst to form the polyurethane.

3. The process of claim 1 wherein the said group member which reacts with the organic polyisocyanate is a polyalkylene ether glycol.

4. The process of claim 1 wherein the said group member which reacts with the organic polyisocyanate is a polyester prepared by esterification of a polyhydric alcohol and a polycarboxylic acid.

5. The process of claim 1 wherein the catalyst is dimethyl-(3-ethoxy-propyl)-amine.

6. The process of claim 1 wherein the catalyst is 1,3-dimethyl - 4,6 - bis - (2' - diethyl - amino - ethoxymethyl)-benzene.

No references cited.